Figure 1:
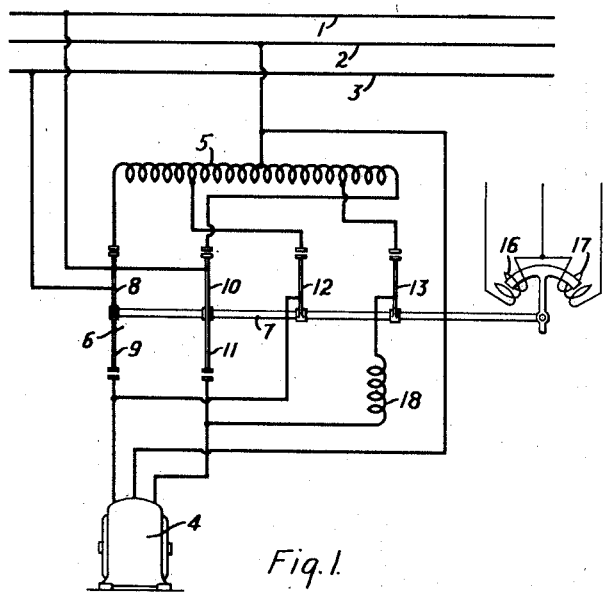

G. E. SLOCUM.
STARTING MECHANISM FOR ELECTRIC MOTORS.
APPLICATION FILED MAR. 9, 1917.

1,343,411.

Patented June 15, 1920.
2 SHEETS—SHEET 1.

WITNESSES:
Fred A. Lind.
J. R. Langley.

INVENTOR
George E. Slocum
BY
Wesley G. Carr
ATTORNEY

G. E. SLOCUM.
STARTING MECHANISM FOR ELECTRIC MOTORS.
APPLICATION FILED MAR. 9, 1917.
1,343,411. Patented June 15, 1920.
2 SHEETS—SHEET 2.
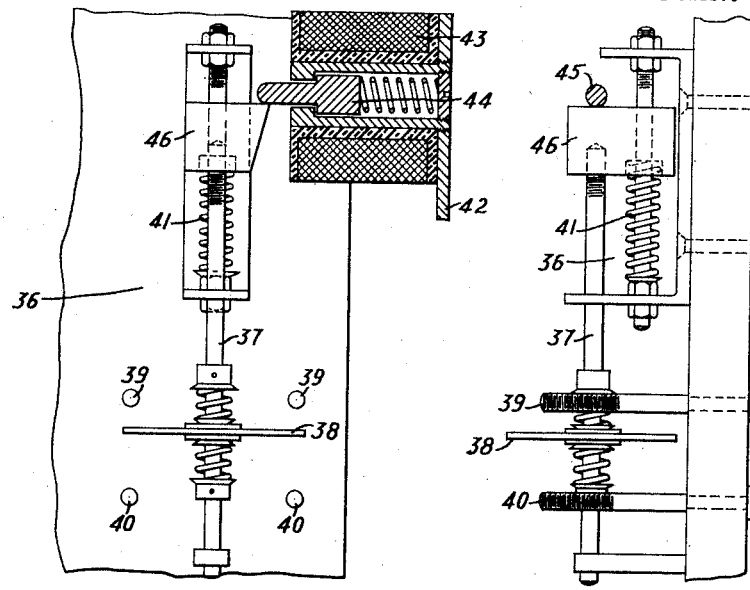
Fig. 5.
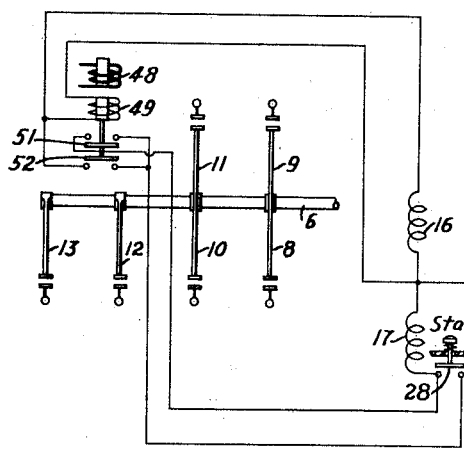
Fig. 7.
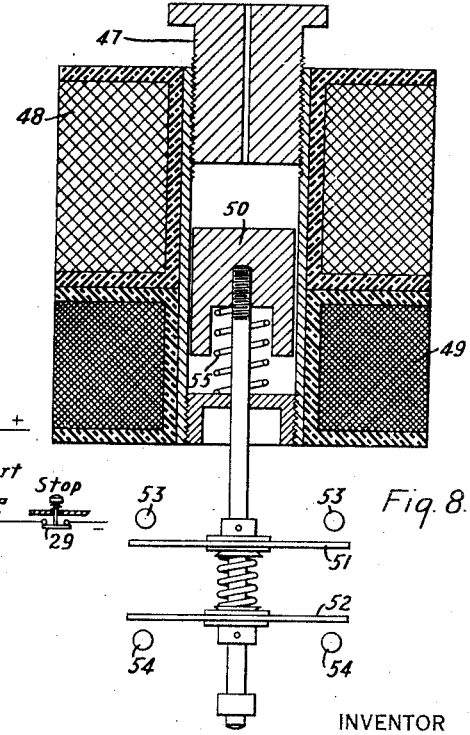
Fig. 6.
Fig. 8.
WITNESSES:
Fred. A. Lind.
J. R. Langley
INVENTOR
George E. Slocum
BY
Wesley G. Carr
ATTORNEY

UNITED STATES PATENT OFFICE.

GEORGE E. SLOCUM, OF CLEVELAND, OHIO, ASSIGNOR TO WESTINGHOUSE ELECTRIC AND MANUFACTURING COMPANY, A CORPORATION OF PENNSYLVANIA.

STARTING MECHANISM FOR ELECTRIC MOTORS.

1,343,411.　　　　　　Specification of Letters Patent.　　Patented June 15, 1920.

Application filed March 9, 1917. Serial No. 153,612.

*To all whom it may concern:*

Be it known that I, GEORGE E. SLOCUM, a citizen of the United States, and a resident of Cleveland, in the county of Cuyahoga and State of Ohio, have invented a new and useful Improvement in Starting Mechanisms for Electric Motors, of which the following is a specification.

My invention relates to starting mechanisms for electric motors, and it has for its object to provide a simple and efficient arrangement for controlling the circuits of electric motors automatically in accordance with conditions obtaining in the motor circuits.

In the operation of starting alternating-current motors by means of auto-transformers and controlling devices therefor, commonly known as auto-starters, it is desirable that the change from starting connections to running connections shall occur when the motor has accelerated to a predetermined degree or the current traversing the motor circuit has fallen to a predetermined value. When the auto-starter is actuated manually to its respective positions, the degree of acceleration of the motor and the value of the currents traversing its circuits cannot be accurately determined by the operator.

In case the motor is operating under a relatively heavy load, excessive current values traverse the motor circuits if the running connections are established before the motor has attained a sufficiently high rate of speed. On the other hand, much valuable time may be lost if the change in connections is delayed after motor-circuit conditions are such that the transfer in connections may safely be made.

Since the value of the current traversing the motor circuits is directly dependent upon the degree to which the motor has been accelerated, the change in connections may be caused to occur automatically when the current traversing the motor circuits has fallen to a predetermined value. I have arranged an auto-starter that is controlled by electromagnetic means. The starting connections are effected by manually operable means. The auto-starter is then controlled entirely automatically, and the running connections of the motor are established when the current falls to a predetermined value, thereby indicating that the speed of the motor is such that the change in connections may safely be made.

Figure 2:
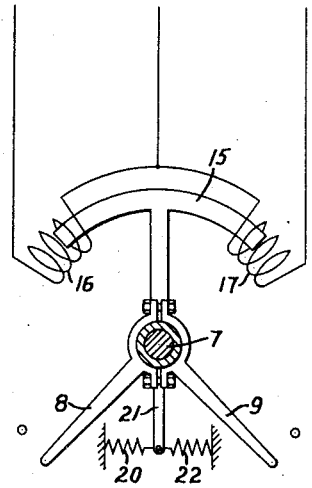
Figure 3:
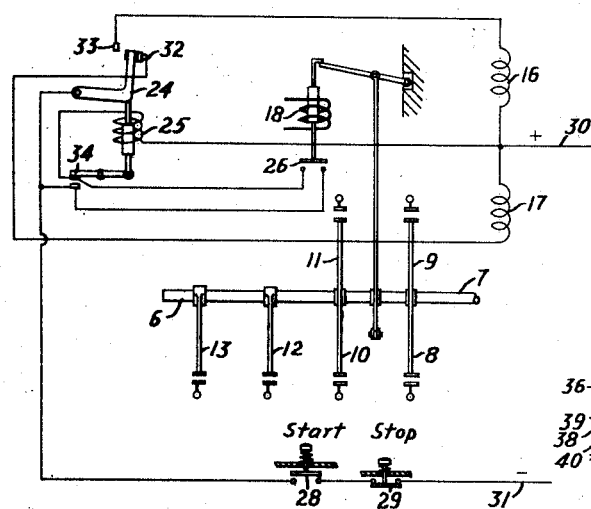
Figure 4:
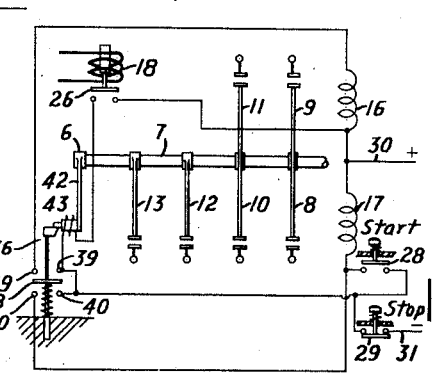

In the accompanying drawings, Figure 1 is a diagrammatic view of the circuits of an electric motor that are controlled by a switching mechanism arranged in accordance with my invention. Fig. 2 is a view, partially in elevation and partially in section, of the switching mechanism. Fig. 3 is a diagrammatic view of circuits and apparatus embodying my invention. Fig. 4 is a view, similar to Fig. 3, of a modification. Figs. 5 and 6 are views, partially in elevation and partially in section, taken at right angles to each other, of a relay mechanism embodied in the system shown in Fig. 4. Fig. 7 is a view, similar to Fig. 3, of a second modification. Fig. 8 is a view, partially in elevation and partially in section, of a relay mechanism embodied in the system shown in Fig. 7. Similar reference numerals are employed throughout the drawings to designate corresponding parts.

Referring particularly to Fig. 1, line conductors 1, 2 and 3, which may be connected to any suitable source of alternating current, supply energy to an alternating-current motor 4. In starting the motor, a reduced voltage is applied to the primary winding of the motor by means of an auto-transformer 5 and a double-throw switching mechanism 6.

Referring also to Fig. 2, the switching mechanism 6 comprises a rotatable shaft 7 which carries switch arms 8, 9, 10, 11, 12 and 13. The pairs of switch arms 8 and 9 and 10 and 11 are respectively electrically connected to constitute double-throw switches. The switch arms 12 and 13 constitute single-throw switches and are arranged to be actuated to their respective closed positions simultaneously with the switch arms 8 and 10.

The shaft 7 is actuated to the one or the other of its operative positions by electromagnetic means comprising a curved core member 15 that is actuated in opposite directions according as the one or the other of solenoids 16 and 17 is energized. The circuits of the coils 16 and 17 are controlled by suitable mechanisms to be later described.

To start the motor 4, the circuit of the coil 17 is closed in any suitable manner and the shaft 7 is rotated in a clockwise direction, as viewed from the right, Fig. 1, to actuate the switch arms 8, 10, 12 and 13 to their respective closed positions. The auto-transformer 5 is thereby connected to line conductors 1, 2 and 3, and the terminals of the primary winding are connected to intermediate points of the auto transformer in order that reduced voltage may be initially applied to the motor windings.

When the motor has accelerated to a predetermined degree, the coil 16 is energized and the coil 17 is deënergized by suitable controlling means comprising the coil 18 that is in series with the motor to actuate the shaft 7 to its running position. The switch arms 9 and 11 now occupy their closed positions and the motor is directly connected to the line conductors 1, 2 and 3.

To stop the motor, it is only necessary to deënergize the coil 16. The shaft 7 is then returned to its central or inoperative position by a spring 20 that is secured, at one end, to a suitable stationary part and, at the other end, to an arm 21 that is connected to the shaft 7. A similar spring 22 is placed under tension when the shaft 7 is actuated to the starting position, the springs 20 and 22 constituting a centering device for yieldingly retaining the switch mechanism 6 in an inoperative position.

Reference may now be had to Fig. 3, in which the arrangements shown in Figs. 1 and 2 are embodied in a system for automatically controlling the circuits of a motor corresponding to the motor 4. The circuits of the auto-transformer 5 and the motor 4 have been omitted as unnecessary to a complete understanding of the arrangement shown in this view. It will be understood, however, that the switching mechanism 6 is electrically connected in the manner shown in Fig. 1.

The circuits of the coils 16 and 17 are controlled by a transfer relay 24 having an actuating coil 25 that is controlled by a relay 26. The latter relay is controlled by the series coil 18. The relay 26 is mechanically interlocked with the shaft 7 in such manner that it cannot close when the shaft 7 is in other than the starting position. The operation of the switching mechanism is initiated by means of a push-button switch 28. The switch mechanism is brought to its inoperative position to stop the motor by the centering device upon the actuation of a push button 29. The push-button switches are respectively designated by appropriate legends.

To start the motor, the push-button switch 28 is closed to complete a circuit which extends from a positive conductor 30 through coil 17, contact member 32, transfer relay 24 and push-button switches 28 and 29 to a negative conductor 31. The coil 17 is energized to actuate the switching mechanism 6 to its starting position in which the switches controlled by the arms 8, 10, 12 and 13 are closed.

The motor then operates under reduced voltage conditions, as described in connection with the system of Fig. 1. A heavy current traverses the motor circuit during the initial portion of the starting operation and the coil 18 is energized to retain the relay 26 in its illustrated position. When the motor attains a rate of speed at which the current traversing the coil 18 and the circuits of the motor falls to a predetermined value, the relay 26 closes to complete a circuit which extends from line conductor 30 through coil 25, relay 26, transfer relay 24 and push-button switches 28 and 29 to conductor 31.

The coil 25 is energized to actuate the relay 24 out of engagement with contact member 32 and into engagement with a contact member 33. The coil 17 is deënergized by the opening of its circuit at contact member 32 and the circuit of coil 16 is completed by the engagement of relay 24 and contact member 33.

The circuit of the coil 16 extends from conductor 30 through coil 16, contact member 33, relay 24 and push-button switches 28 and 29 to conductor 31. Normal voltage is then applied to the motor winding to accelerate it to its normal speed.

The actuation of the shaft 7 to its running position operates, through the mechanical interlocking means, to retain the relay 26 in its open position. The circuit of the coil 25 is maintained, however, by a relay 34 that is closed when the coil 25 is energized to actuate the transfer relay 24.

The transfer relay 24 is accordingly retained in engagement with the contact member 33 until the push-button switch 29 is actuated to open the circuit of the coil 25, whereupon the relay 24 drops out of engagement with the contact member 33. The coil 16 is deënergized and the switching mechanism 6 assumes its central or inoperative position.

Reference may now be had to Fig. 4, in which a modified arrangement of my invention is illustrated. The principal difference between the arrangement shown in Fig. 4 and that shown in Fig. 3 is in the means for transferring the connections of the coils 16 and 17. The relay 36, which controls the connections of the coils 16 and 17, is shown in enlarged detail in Figs. 5 and 6.

Referring to the latter views, a longitudinally movable rod 37 carries a contact disk 38 which engages contact members 39 or 40, according as it occupies its upper or its lower positions. A spring 41 tends to actuate the contact disk 38 into engagement with the contact members 39. The shaft 7 of the switching mechanism is, however, mechanically interlocked with the relay 36 by means of an arm 42 which carries an electromagnet 43. The electromagnet 43 is provided with a movable core member 44 having a projecting portion 45 which engages a member 46 that is secured to the rod 37.

In the normal position of the shaft 7, the arm 42 retains the rod 37 and its connected parts in an intermediate position, being approximately that in which they are illustrated in Figs. 4, 5 and 6. The spring 41 is accordingly under stress.

To start the motor, the push-button switch 28 is closed to complete a circuit which extends from line conductor 30 to coil 17 and push-button switches 28 and 29 to conductor 31. The switching mechanism 6 is then actuated to its starting position. The arm 42 actuates the rod 37 and the contact disk 38 to their respective lower positions to complete a circuit for shunting the push-button switch 28. The latter may, accordingly, be released substantially immediately after it has been actuated.

When the current traversing the motor circuit falls to the predetermined value at which the relay 26 is permitted to close, a circuit is completed which extends from conductor 30 through relay 26, coil of magnet 43, and push-button switch 29 to conductor 31. The magnet 43 is thereby energized to actuate the core member 44 out of engagement with the member 46. The spring 41 then actuates the contact disk 38 out of engagement with contact members 40 and into engagement with contact members 39. The circuit of coil 17 is interrupted and a circuit for coil 16, which is thereby completed, extends from conductor 30, through coil 16, contact members 39, contact disk 38 and push-button switch 29 to conductor 31.

The switching mechanism 6 is then actuated to its running position and the motor operates under normal conditions. To stop the motor, it is only necessary to open the push-button switch 29 to effect the deënergizing of coil 16. The shaft 7 and its connected parts then assume their respective central or inoperative positions and the arm 42 actuates the relay mechanism to its normal position in readiness for the succeeding starting operation.

Another form of my invention is illustrated in Fig. 7. An enlarged view of a relay 47, which is embodied in the arrangement shown in Fig. 7, is illustrated in Fig. 8. The relay 47 comprises a series coil 48, which corresponds to the coil 18, and a shunt coil 49. A movable core member 50, which is actuated to the one or the other of its operative positions in accordance with the forces exerted upon it by the coils 48 and 49, is operatively connected to contact disks 51 and 52 that respectively coact with contact members 53 and 54. A spring 55 yieldingly retains the relay mechanism in its central or inoperative position, with the contact disks out of engagement with the respective contact members. The spring 55 is so designed, however, as to permit the engagement of contact disk 52 with its coacting contact members when the core member 50 and the connected parts are actuated from their upper positions by force of gravity.

To start the motor, the push-button switch 28 is closed to complete a circuit for the coil 17. The switching mechanism 6 is actuated to its starting position to complete the motor circuits and thereby effect the energizing of series coil 48. The relay is thereby actuated to its upper position in which the contact disk 51 engages the contact members 53 to complete a shunt circuit for the push-button switch 28.

When the current traversing the motor circuit falls to a predetermined value, at which the coil 48 is sufficiently deënergized to permit the core member 50 and its connected parts to fall to their lower positions, the disk 52 engages contact members 54 to complete the circuit of the coil 16 and to open the circuit of coil 17. The coil 49 is energized by a circuit completed by the contact disk 52 and contact members 54 to retain the relay mechanism in its lower position. The motor may be stopped at any time by opening the push-button switch 29.

By means of the arrangements described above, it is only necessary to actuate a push-button switch, whereupon the motor is connected to the source of energy through an auto-transformer and is then automatically connected directly to the line when the current traversing the motor circuit falls to a predetermined value. The motor may be stopped at any time during the starting operation or after it is operating at normal speed by simply actuating a second push-button switch.

I claim as my invention:

1. In a motor-control system, the combination with an induction motor, a source of energy therefor and a transformer for supplying a reduced starting voltage for said motor, of means for connecting said motor to said transformer, and a double-throw switch normally occupying an inoperative position, and adapted, in accordance with the value of the current traversing said motor, to occupy two operative positions, said switch serving to maintain said connection in one of its operative positions and serving to break said connection and connect said motor to said source in its other operative position.

2. In a starting device for electric motors, the combination with a switching mechanism having a plurality of operative positions, of a pair of coils for actuating said mechanism to said operative positions, a double-throw switch adapted, when occupying one of its positions, to energize one of said coils, a coil for maintaining said switch in its other position to energize said other coil, and means, controlled in accordance with the value of the current traversing said motor, for energizing said third coil.

3. In a starting device for electric motors, the combination with a switching mechanism having a plurality of operative positions, of a pair of coils for actuating said mechanism to said operative positions, a double-throw switch for controlling said switching mechanism according to its position, said switch normally occupying an inoperative position, means for closng the circuit of one of said coils, means for actuating said switch to one of its operative positions to maintain said circuit closed, and means, controlled in accordance with the value of the current traversing said motor, for closing the circuit of said other coil.

4. In a starting device for electric motors, the combination with a switching mechanism having a plurality of operative positions, of a pair of coils for actuating said mechanism to said operative positions, a double-throw switch normally occupying an inoperative position, means for closing the circuit of one of said coils and means, controlled in accordance with the value of the current traversing said motor, for successively actuating said switch to one of its operative positions to maintain said circuit closed and to its other operative position to open said circuit and close the circuit of said other coil.

5. In a starting device for electric motors, the combination with a switching mechanism having a pair of operative positions, of a pair of coils, a double-throw switch, means for energizing one of said coils to actuate said mechanism to one of said operative positions, means for actuating said double-throw switch to one of its positions to maintain said one coil energized, and means, controlled in accordance with the value of the current traversing said motor, for actuating said double-throw switch to its outer position to energize said other coil to actuate said mechanism to said other operative position.

In testimony whereof, I have hereunto subscribed my name this 3rd day of March 1917.

GEORGE E. SLOCUM.